United States Patent [19]

Cobbs

[11] 4,099,745
[45] Jul. 11, 1978

[54] DRILL PIPE JOINT

[76] Inventor: James H. Cobbs, 5144 S. New Haven, Tulsa, Okla. 74135

[21] Appl. No.: 784,288

[22] Filed: Apr. 4, 1977

[51] Int. Cl.² .............................................. F16L 35/00
[52] U.S. Cl. ..................................... 285/24; 285/330; 285/347; 285/354; 285/DIG. 14; 285/DIG. 15; 403/307; 403/341; 403/343
[58] Field of Search ............... 285/DIG. 14, DIG. 15, 285/330, 115, 354, 386, 391, 24, 27, 347, 355; 403/307, 341, 343

[56] References Cited

U.S. PATENT DOCUMENTS

| 1,054,812 | 3/1913 | Zierath | 285/330 X |
|---|---|---|---|
| 1,542,266 | 6/1925 | Palmer et al. | 285/330 |
| 2,094,416 | 9/1937 | Sheffield | 285/330 |
| 2,307,275 | 1/1943 | Johnson | 285/330 X |
| 2,999,701 | 9/1961 | Blair et al. | 285/354 X |
| 3,361,453 | 1/1968 | Brown et al. | 285/330 X |
| 3,623,753 | 11/1971 | Henry | 285/330 |
| 3,863,959 | 2/1975 | Blaschke | 285/DIG. 14 X |

Primary Examiner—Werner H. Schroeder
Assistant Examiner—Conrad L. Berman
Attorney, Agent, or Firm—Head, Johnson & Chafin

[57] ABSTRACT

A tool joint for drill pipe which is particularly well adapted for large diameter drill pipe, comprises a pin section and a box section. Each section of the tool joint is adapted at a first end to be attached to the drill pipe by welding, or threads, as is conventionally done. The principal part of the tool joint is of larger diameter than the pipe and includes a plurality of longitudinal, circumferentially-spaced tongues and grooves in the form of a jaw clutch. The tongues in the pin section match the grooves in the box section and vice versa. Means are provided to polarize the tongues and grooves so that they fit together in only one angular position. A tubular extension on the second end of the pin section is adapted to fit into a bored opening or socket in the second end of the box section. O rings or other means, are provided to seal the tubular extension into the bored opening. The outer circumferential surface of the enlarged portions of the tool joint sections are threaded with a selected, uniform diameter, thread. A threaded collar is screwed over the full threaded section. This locks the two tool joint sections in tension, while the tongues and grooves provide full torque transmitting capacity of the drill pipe.

7 Claims, 7 Drawing Figures

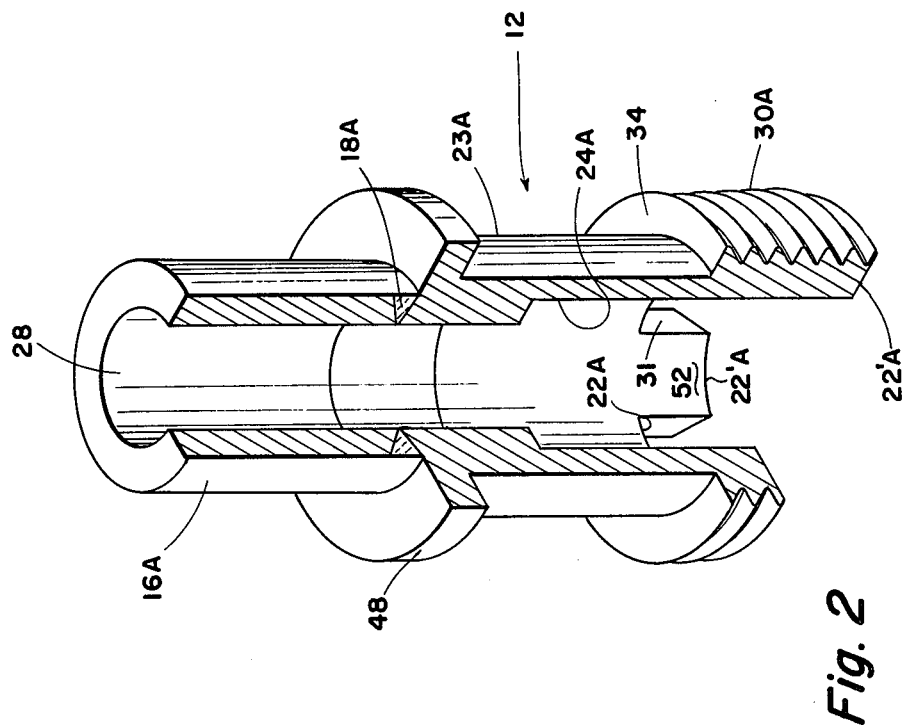
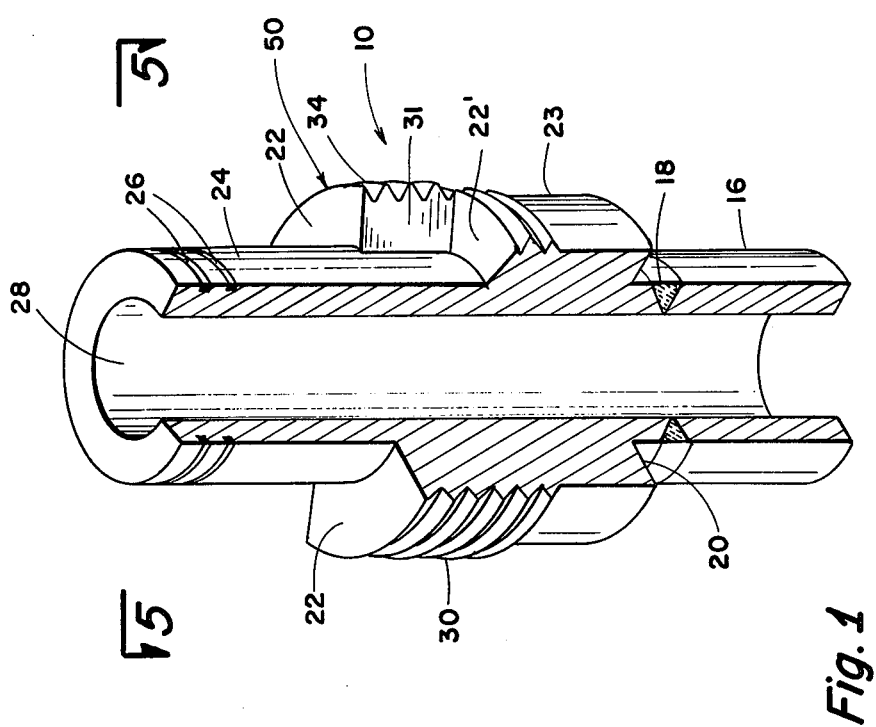

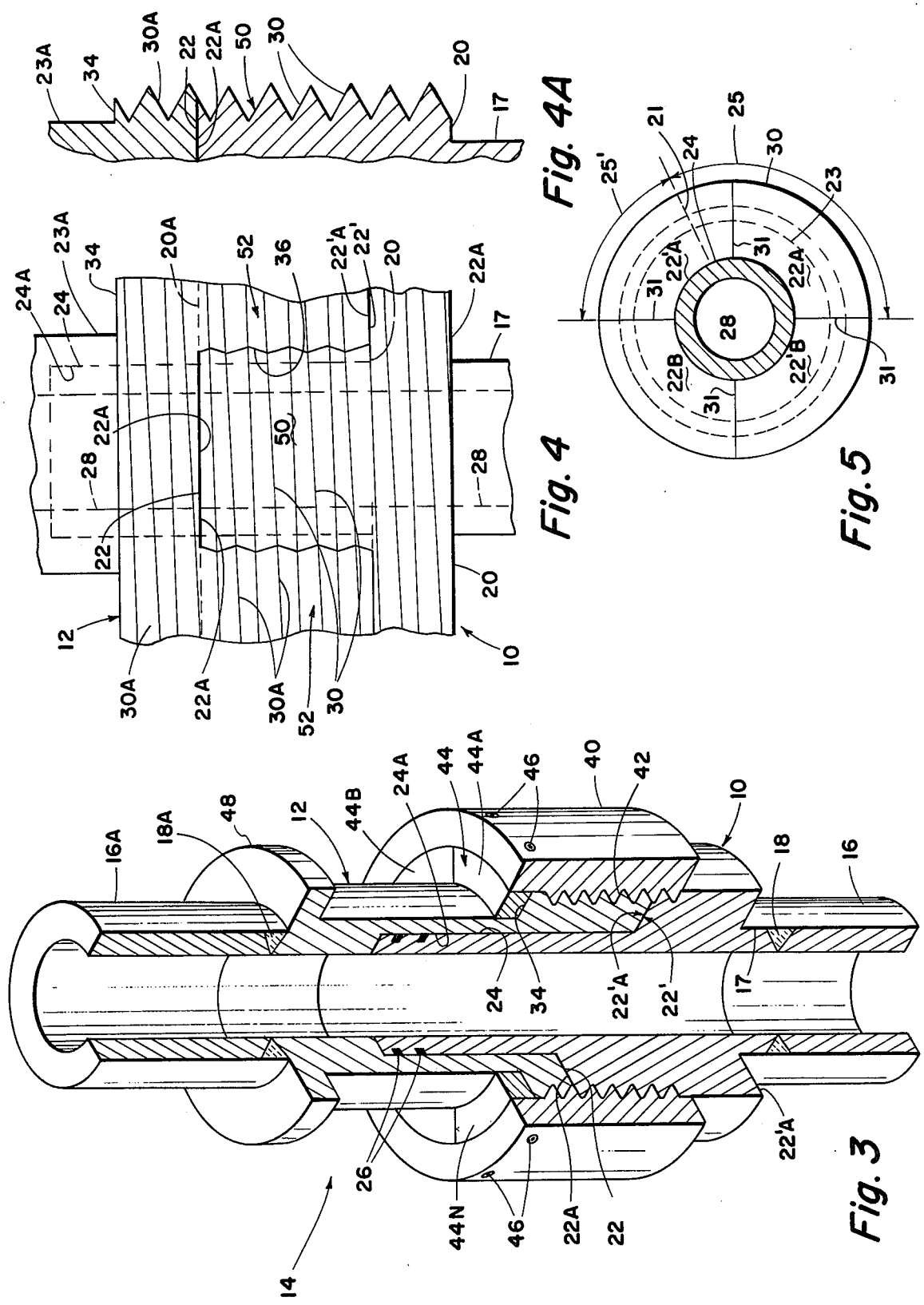

DRILL PIPE JOINT

BACKGROUND OF THE INVENTION

1. Field of the Invention

This invention lies in the field of deep hole drilling by the rotary method. More particularly, it concerns a type of tool joint for drill pipe in which the transmission of torque from one joint of pipe to the other is by means of mating tongues and grooves in two sections of the tool joint, as in a jaw clutch, while the tensile strength of the joint is provided by a threaded collar which is screwed over the threads after the two halves of the tool joint are meshed.

Still, more particularly, this improved tool joint for drill pipe is concerned with large diameter drill pipe, and provides means for transmitting full torque of the drill pipe without transmitting it through the threads.

2. Description of the Prior Art

Currently available rotary shoulder tool joints for situations of extremely high drilling torques, are not satisfactory. Current tool joints rely on the face pressure between the mating surfaces of the threads to develop adequate frictional force to prevent the joint from making up tighter as drilling torque is transmitted through the joint. This is satisfactory for small diameter drill pipe, where the face contact area of the tool joint thread is large in relationship to the diameter of the drill pipe itself. These tool joints will develop torque transmitting characteristics equal to the torque capacity of the pipe body itself.

With the advent of large diameter borehole drilling, using drill pipe of 8 ⅝ inches to 20 inches outside diameter, the problem of developing adequate torque transmission characteristics through the rotary shouldered tool joints becomes increasingly burdensome. Very high instantaneous drilling torques are common, which tightens each joint of drill pipe in the drill string, and on occasion has tightened joints to the point where the mating surfaces of the threads were literally welded together, and it was impossible to break the connections.

SUMMARY OF THE INVENTION

It is a primary object of this invention to provide a tool joint for large diameter drill pipe, in which the torque is transmitted from pipe joint to pipe joint through the tool joint, by means of longitudinal tongues and grooves, as in a jaw clutch, and to provide the tensile strength of the joint by means of threads on the matching sections of the tool joint, and a threaded collar over the tool joint.

It is a further object of this invention to provide a separate means for sealing one tool joint section to the other.

In the conventional taper-threaded tool joint, the threads on the pin and box serve three important purposes, namely: provides means to transmit the torque from one pipe section to the other, to provide tensile strength between the two pipe sections and to seal the joint against leakage of mud from the inside of the pipe. In the present invention all three features are supplied by separate parts of the tool joint, and the threads, instead of being tapered as in the conventional pipe, are straight (cylindrical). The threads serve solely to provide tensile strength to the joints.

The torque is transmitted from the box section of the tool joint to the pin section, by means of a plurality of circumferentially spaced tongues and grooves, or interlocking fingers, or jaws. The first ends of the tool joint sections are adapted to be attached to one end of a section of drill pipe, in the conventional manner. The second face of the pin section is adapted to fit the second face of the box section, and to permit the inter-fingering of the tongues and grooves. There is sufficient cross-section of metal in the fingers, so that the full torque strength of the drill pipe itself can be transmitted through the tongues and grooves, from one pipe joint to the other. The pin section has a longitudinally extending, axial, tubular portion, which fits into an appropriate bored-out axial socket portion, of the box section. O rings, or other means, are provided for sealing the two surfaces, so that when the extension of the pin section is fitted into the socket of the box section, the internal conduit of the tool joint, which is an extension of that of the drill pipe, is sealed against leakage between the two halves of the tool joint.

BRIEF DESCRIPTION OF THE DRAWINGS

These and other objects and advantages of the invention and a better understanding of the principles and details of the invention will be evident from the following description taken in conjunction with the appended drawings, in which;

FIG. 1 is an isometric illustration of the pin section of the tool joint.

FIG. 2 is an isometric illustration of the box section of the tool joint.

FIG. 3 is an isometric illustration of the completely assembled tool joint.

FIGS. 4 and 4A illustrate the manner in which the pin and box sections mesh.

FIG. 5 is a cross-sectional view taken along the plane 5—5 of FIG. 1.

DESCRIPTION OF THE PREFERRED EMBODIMENT

Figure 6:
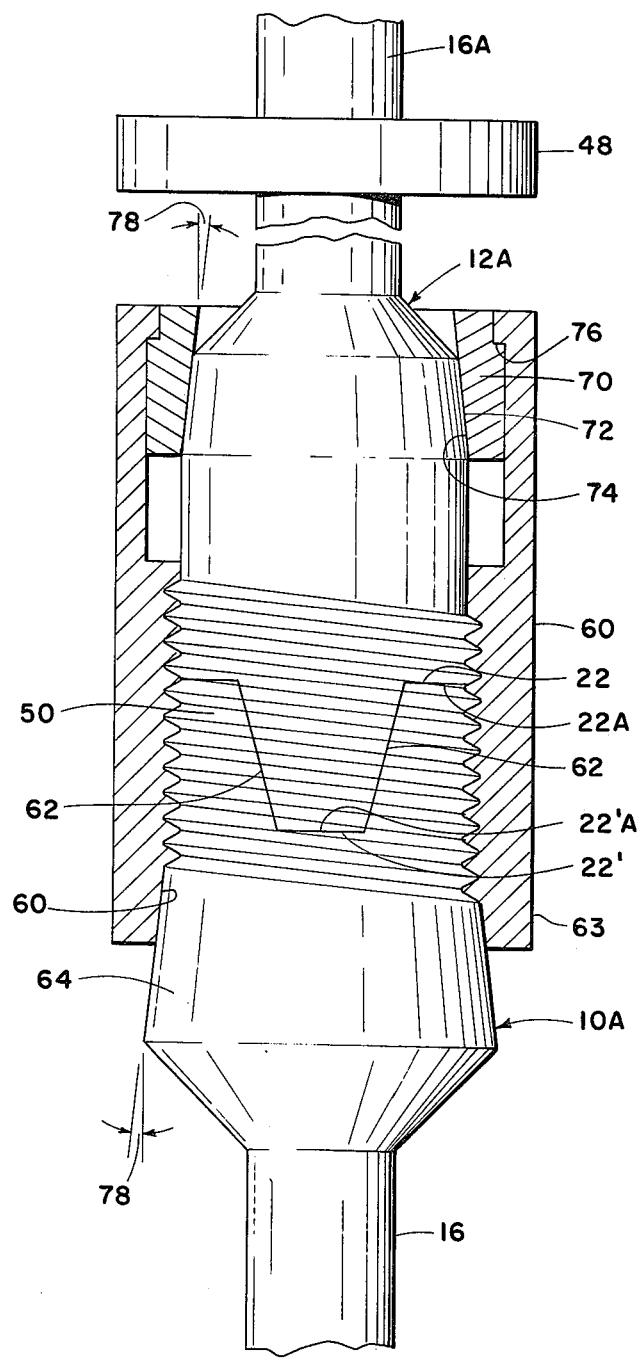
FIG. 6 illustrates a modified form of the embodiment of FIG. 3.

Referring now to the drawings and in particular to FIG. 1, there is shown a view of the pin section of the tool joint indicated generally by the numeral 10. There is a central axial opening 28 which is of equal diameter to the internal opening of the drill pipe, of which one end 16 is shown in FIG. 1. The first end of the pin section 17 is attached to the end of the drill pipe 16 by means of a circumferential weld 18, as is conventionally done. It is possible also to attach the tool joint to the drill pipe by means of threads, or by any other conventional method.

The pin section has a larger diameter portion 23, which carries a plurality of threads 30 of constant diameter.

Referring to FIG. 5 there is shown a view taken across the plane 5—5 of FIG. 1, which shows the tubular extension portion 24 in cross-section, and the axial opening 28. There are shown four quadrants labeled 22A, 22'A, 22B, 22'B. The two opposite portions 22A and 22B are tongues, and the portions 22'A and 22'B are grooves, as in a corresponding half of a jaw clutch. There can be any number of tongues and grooves as desired, and they can be polarized in any selected manner, such as by different angular widths, or different lengths, so that the tool joint can be meshed in only one angular relation.

It will be clear that when the pin and box sections are meshed so that the tongues of one part mesh into the grooves of the other part, that the circumferential threads must be continuous so that a collar can be screwed over the threads. If there was no polarization and if the tongues and grooves were meshed in another angular position, of course, the threads would not be continuous and the collar could not be screwed over the threads.

By making one of the tongues 22A of greater angular width as indicated by the dashed line 21, then the width would correspond to the numeral 25, while the matching groove 22'A would be of a reduced width 25'. If the matching portions of the box section would have a trough of width 25 and an adjacent tongue of narrow width 25', it will be clear that the joint can be meshed in only one angular position.

It is also possible to make one prong or tongue longer than the other, and one matching groove deeper, to fully mesh the joint it would have to be meshed in one particular angular position, with the long tongue in the deep groove.

The pin section has an axial tubular extension 24 which extends beyond the upper face 22 of the tongues. One or more O rings 26 (or other seal means) are provided on the outer surface of this extension 24. As shown in FIG. 2, which is an isometric view of the box section, there is an internal bored socket 24A, which is of a matching diameter to the tubular extension 24 of the pin section. When the pin section 10 is meshed into the box section, the extension 24 fits into the bored opening or socket 24A and the annular space is sealed by means of the O rings 26.

In FIG. 1, the plane surfaces which are perpendicular to the axis of the tool joint, and which constitutes the upper ends of the tongues are labeled 22 and the corresponding plane surfaces in the bottoms of the grooves are labeled 22'. In FIG. 2, the plane surfaces which are transverse to the axis of the box section 12, and which mesh with the surfaces 22' are labeled 22'A and the parts that mesh with the surfaces 22 are labeled 22A. In FIG. 2, further, the plane surface which represents the upper end of the threads of the box section is labeled 34. Beyond that, towards the first (upper) end of the box section, is a thicker section labeled 23A which corresponds to the part 23 of the pin section.

Beyond that there is a flange 48 which is called a collar stop, which is intended to prevent the collar 40 from being unscrewed completely from the top threads 30A of the box section. This will be explained in greater detail in connection with FIG. 3. Beyond that is a short section which is of the same diameter as the pipe 16A to which it is welded by means of the circumferential welds 18A. The box section therefore extends from the surfaces 22'A of the tongues at the second end of the box section, to the welds 18A at the first end of the box section where it is attached to the pipe 16A.

Referring now to FIGS. 4 and 4A, there is shown a side view of the meshed box and pin sections. Shown is a prong or tongue 50 of the pin section with the upper surface 22, which meshes in a corresponding trough or groove of the box section 12. Correspondingly, on the sides, are pins or tongues 52 of the box section, which fit into corresponding grooves in the pin section.

When the pin and box sections are meshed, there is a solid cylindrical portion between the top surface 34 of the box section to the bottom surface 20 of the pin section. The outer surface of this cylinder is theaded with threads of any standard selected design, and of a straight, or cylindrical form. The threads in the box section are arbitrarily labeled 30A while the threads in the pin section are labeled 30. In FIG. 4, it is clear that the threads on the two sections are colinear so that a collar can be threaded over the joint after it is fully meshed. Shown also in dashed line is the tubular extension 24 of the pin section inserted into the bored enlargement or socket 24A of the box section.

Referring now to FIG. 3, there is shown a view of the pin and box sections meshed, with a threaded collar 40 screwed over the threads 30, 30A of the two sections as they are meshed. It will be clear that the torque is transmitted between the pin and box sections by the radial walls 31 (FIG. 5) while the tensile strength of the joint is taken care of by the threaded collar 40.

To open or break the joint of FIG. 3, the collar 40 would be unscrewed upwardly, and when its lower edge was above the surfaces 22 of the pin, the pin section can then be withdrawn and the joint is broken. If the collar is to be removed completely, it could then be unscrewed downwardly from the box section and be removed. However, it is important that the collar 40 remain with the box section so that (a) it does not get lost, and (b) it does not get the threads injured. Consequently, a segmented ring 44 is positioned inside of the collar at its top end, and held there by screws 46. With these screws in place, the segments 44A, 44B . . . 44N comprise an internal flange that acts as a stop when the collar is theaded downwardly to hold the joint together. Also, in combination with the collar stop 48, the ring 44 provies a means of preventing the complete removal of the collar above the top threads 30A of the box section. In other words, in normal practice, the collar would remain attached to the top threads of the box section and in making up a joint, it would require the fewest number of turns to screw it down to lock the joint together.

Referring now to FIG. 6, there is shown a modification of the embodiment of the invention illustrated in FIG. 3, which differs in two important aspects. The first is that the tongues and grooves of the two parts of the joint which mesh together are shown as tapered instead of rectangular, as illustrated in FIG. 4, The tapering of the tongues and grooves provides for more rapid insertion and meshing of the two halves of the tool joint. Thus the surfaces 62 defining the walls of the tongues are tapered, whereas in FIG. 4, the walls of the tongues are longitudinal, forming rectangular tongues.

The bottom part 10A, or pin section of the tool joint, has a tapered body section 64 rather than a cylindrical body section 23 as shown in FIG. 1. Similarly, the body section 72 of the box section 12A is tapered, rather than cylindrical 23A, as shown in FIG. 2.

The collar 50, of the tool joint, has an extension skirt 63 beyond the threads on the open end, which is tapered on the inside surface to a conical section. The taper angle 78 is in the range of from 5° to 15°, with the most probably taper being about 6°. This angle of taper 78 will match a similar taper on the pin 10A at 60. This will create a metal to metal friction connection which, when the collar is made to the appropriate torque, will prevent an accidental back-off of the collar.

Likewise at the closed end of the collar, the segmented ring 70 will have a similar taper 78 which will mate with the taper 74 on the corresponding part 72 of the box part 12A of the toll joint, to provide an additional measure of friction, to prevent backing-off of the collar. The angle of taper 78 is illustrated as the same on the two parts of the tool joint, and on both ends of the collar. This angle would optimally be about 6° for the best friction condition.

In the design of FIG. 6, the segmented ring is of a somewhat different construction than in FIG. 3, being longer in longitudinal dimension, and locking under an inner shoulder 76 on the collar.

The other identifying numerals of FIG. 6 corresponding to those of the embodiments shown in other figures of the drawings. The embodiment of FIG. 6 has all the advantages of those illustrated in FIGS. 1 to 5, and in addition has the advantage of easier meshing of the two parts of the tool joint, and more positive locking of the collar by frictional means on the tool joint. Thus, in normal use, the collar 60 will not back-off, permitting the tool joint to separate.

What has been described is a type of tool joint which differs from the conventional type of tool joint, in which the tapered threads on a pin and box, serve three important purposes namely torque transmission, tensile strength and fluid sealing. In this type of tool joint, the three actions of the joint are separated. A plurality of tongues and grooves, or fingers, or jaws are provided for the transmission of torque across the joint. A threaded collar is provided to hold the joint together and provide tensile strength for the joint. The fluid sealing is provided by means of an O ring (or other) seal on an axial cylindrical projection of the pin section, into the box section.

In the prior art, there have been instances of the use of jaw type tongues and grooves for transmission of torque. However, these have been entirely separate from the threads, and necessitate a lengthening of the tool joint by the extent of the jaws. In this design, the jaws are also covered with threads so that a greater length of thread can be provided without increasing the length of the tool joint.

In the manufacture of the tool joints, it seems desirable to machine the tongues and grooves so that the pin and box sections mesh properly and then by mounting the joints on a suitable mandril the threads are cut.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A rotary drill pipe tool joint, comprising;
   (a) a pin section and a box section, both sections of said tool joint of larger outer diameter than that of said drill pipe, and adapted to be attached at their first ends individually to first and second ends of a joint of drill pipe, by conventional means, axial openings through said sections corresponding to the axial opening through said pipe;
   (b) at their second ends, both said pin and box sections threaded with identical straight threads of any selected form;
   (c) a plurality of longitudinal tongues and grooves cut into the ends of said theaded portions, of selected width and angular spacing such that the tongues on the end of the pin section will fit into the grooves of the box section, and vice versa, and means to polarize said tongues and grooves so that the two parts of a tool joint will fit together in only one angular position;
   whereby when said parts are meshed, the threads on the two parts will be collinear with each other;
   (d) a cylindrical extension on the second end of said pin section, and an axial socket on the second end of said box section, of corresponding diameters, and means to seal said extension in said socket; and
   (e) threaded collar means adapted to screw over the threaded meshed tongues, to couple said pin and box sections together.

2. The tool joint as in claim 1 in which said collar means is part of said box section and includes a removable inner flange whereby when said pin and box sections are messhed, said collar can be screwed with said flange tightly against the shoulder of said box section, on the end of the threaded portion, facing said pipe joint.

3. The tool joint as in claim 2 in which said flange is a segmented ring removably held to said collar;
   whereby said collar is locked to said box section.

4. The tool joint as in claim 1 including a flange near the first end of said box section, which acts as a stop to prevent unscrewing the collar completely from the threaded portion of said box section.

5. The tool joint as in claim 1 in which said means to seal said cylindrical extension of said pin section into said socket comprises "O" rings.

6. The tool joint as in claim 1 including a tapered inner surface at least on one end of said threaded collar, matching a corresponding taper on the corresponding part of said tool joint, whereby when said collar is screwed to the point where the two tapered surfaces meet, the collar can be tightened to the point where it will not unscrew in service.

7. The tool joint as in claim 6 wherein both parts of said tool joint have tapered surfaces, and said collar has a corresponding tapered surface on its open end and on its segmented ring.

* * * * *